(12) United States Patent
Hagihara et al.

(10) Patent No.: US 11,454,300 B2
(45) Date of Patent: Sep. 27, 2022

(54) DRIVE GEAR AND DRIVEN GEAR

(71) Applicant: ENPLAS CORPORATION, Saitama (JP)

(72) Inventors: Toru Hagihara, Saitama (JP); Shuhei Masuda, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 97 days.

(21) Appl. No.: 17/051,954

(22) PCT Filed: May 13, 2019

(86) PCT No.: PCT/JP2019/018958
§ 371 (c)(1),
(2) Date: Oct. 30, 2020

(87) PCT Pub. No.: WO2019/221064
PCT Pub. Date: Nov. 21, 2019

(65) Prior Publication Data
US 2021/0239185 A1 Aug. 5, 2021

(30) Foreign Application Priority Data
May 15, 2018 (JP) .............................. JP2018-093612

(51) Int. Cl.
*F16H 1/16* (2006.01)
*F16H 55/22* (2006.01)
*F16H 1/12* (2006.01)

(52) U.S. Cl.
CPC ............... *F16H 1/16* (2013.01); *F16H 55/22* (2013.01); *F16H 1/125* (2013.01)

(58) Field of Classification Search
CPC ............. F16H 1/16; F16H 55/22; F16H 1/125
See application file for complete search history.

(56) References Cited

U.S. PATENT DOCUMENTS 856,405 A  *  6/1907  Janson ................... F16H 1/125
                                                    74/424.5
1,422,000 A  *  7/1922  Schmick .................. F16H 1/24
                                                    74/424.5

(Continued)

FOREIGN PATENT DOCUMENTS

JP        2005508484 A        3/2005
JP        2009127677 A        6/2009

OTHER PUBLICATIONS

English lanuguage translation of the International Search Report for International Application No. PCT/JP2019/018958 dated Jul. 22, 2019.

(Continued)

*Primary Examiner* — Terence Boes
(74) *Attorney, Agent, or Firm* — Howard & Howard Attorneys PLLC

(57) ABSTRACT

A gear reduction mechanism (1) includes a drive gear (10) having a rotation axis ($L_1$), and a driven gear (20) driven in mesh with the drive gear (10) and having a rotation axis ($L_2$) that is noncoplanar with the rotation axis ($L_1$). The drive gear (10) is provided with spiral teeth, each having a tooth trace of a spiral curve having a spiral center on the rotation axis ($L_1$) and a constant radial pitch, when viewed in the direction of the rotation axis ($L_1$). Furthermore, the tooth profile of the driven gear (20) is set, considering a tangent angle that changes momentarily as the drive gear (10) rotates.

7 Claims, 13 Drawing Sheets

(56) References Cited

U.S. PATENT DOCUMENTS

| | | | | |
|---|---|---|---|---|
| 2,749,761 A * | 6/1956 | Mackta | ................... | F16H 1/125 |
| | | | | 74/216.3 |
| 2004/0221672 A1 * | 11/2004 | Fleytman | ................ | F16H 55/22 |
| | | | | 74/425 |
| 2004/0237689 A1 * | 12/2004 | Hiltbrand | ................ | F16H 1/125 |
| | | | | 74/457 |
| 2005/0161304 A1 * | 7/2005 | Brandl | ................... | F16H 1/125 |
| | | | | 192/223 |
| 2013/0042711 A1 | 2/2013 | Napau et al. | | |

OTHER PUBLICATIONS

English language abstract for JP 2005-508484 obtained from espacenet.com database.

English language abstract for JP 2009-127677 obtained from espacenet.com database.

Japanese Office Action dated Mar. 8, 2022 in Appln. No. 2018-093612 and its partial English translation.

* cited by examiner

DRIVE GEAR AND DRIVEN GEAR

This Application is the National Stage of International Application No. PCT/JP2019/018958 filed on May 13, 2019, which claims priority to Japanese Patent Application No. 2018-093612 filed on May 15, 2018. The entire contents of this application are incorporated herein by reference in their entirety.

TECHNICAL FIELD

The present invention relates to drive gears and to driven gears driven in mesh with drive gears, and in particular, relates to drive gears and driven gears in gear reduction mechanisms, in which the axis of rotation of a drive gear and that of a mating driven gear are arranged to be noncoplanar.

BACKGROUND ART

For example, a known conventional gear reduction mechanism including a drive gear and a driven gear with noncoplanar rotation axes is a gear reduction mechanism in which the drive gear is a worm, and the driven gear is a worm wheel, to reduce the rotational speed of the worm by the worm wheel, as described in Patent Document 1.

REFERENCE DOCUMENT LIST

Patent Document

Patent Document 1: JP 2009-127677 A

SUMMARY OF THE INVENTION

In a feature, a drive gear for driving a mating gear in mesh is described. The drive gear, comprising spiral teeth, each having a tooth trace of a spiral curve having a spiral center on a rotation axis and a constant radial pitch, when viewed in a direction of the rotation axis.

In further features, each of the spiral teeth is formed along a curve obtained by projecting the spiral curve in the direction of the rotation axis onto a conical surface of a cone that has an axis coinciding with the rotation axis.

In further features, two or more spiral teeth overlap in a radial direction at any angle around the rotation axis.

In further features, the spiral curves are arranged at even angular intervals around the rotation axis, and each of the spiral teeth has the tooth trace of the corresponding spiral curve.

In further features, a driven gear driven in mesh with the aforementioned drive gear is described. The driven gear having a rotation axis that is noncoplanar with the rotation axis of the drive gear, where the driven gear is a helical gear having a helix angle $\beta$ within a range specified by $\gamma_{min} \leq \beta \leq \gamma_{max}$, where $\gamma_{min}$ is an angle between a tangent line to the spiral curve of a spiral tooth at a maximum radius that is a radius at a point farthest from the rotation axis of the drive gear, and a line segment perpendicular to the maximum radius, and $\gamma_{max}$ is an angle between a tangent line to the spiral curve of a spiral tooth at a minimum radius that is a radius at a point closest to the rotation axis of the drive gear, and a line segment perpendicular to the minimum radius.

In further features, the helix angle $\beta$ is set to zero when an amount of parallel displacement from a point at which the helical gear and the drive gear are in mesh satisfies a predetermined condition.

In further features, a crowning magnitude of the helical gear is set based on a contact state of a spiral tooth at the minimum radius and a tooth of the helical gear.

In further features, the helical gear has a radius less than the maximum radius of the drive gear.

Problem to be Solved by the Invention

In the conventional worm, it is possible to design the worm to have a larger diameter by, for example, making the outer diameter of the worm greater than that of the worm wheel, depending on needs for a device to which the gear reduction mechanism is applied (application target).

However, when molding the worm with resin, so-called rotation removal is required. Therefore, there is concern that manufacturing cost may increase in comparison to a case of increasing the diameter of a drive gear that does not require rotation removal, due to replacement of molds and machines associated with the rotation removal. In addition, because of limitations that the worm wheel needs to be arranged in the radial direction of the worm, it may be difficult to adapt a gear reduction mechanism with a greater worm diameter to an application target of the gear reduction mechanism, if there is not enough space in the radial direction of the worm in the application target of the gear reduction mechanism.

Therefore, in view of the problems, an object of the present invention is to provide a drive gear and a driven gear, which are capable of suppressing an increase in manufacturing cost and improving the compatibility of a gear reduction mechanism to an application target thereof, when increasing the diameter of the drive gear.

Means for Solving the Problem

In order to solve the problems, a drive gear according to the present invention drives a mating gear in mesh, and includes spiral teeth, each having a tooth trace of a spiral curve having a constant radial pitch, when viewed in a direction of the rotation axis.

Furthermore, a driven gear according to the present invention is a helical gear driven in mesh with the drive gear according to the present invention, the helical gear having a rotation axis that is noncoplanar with the rotation axis of the drive gear, and the helix angle $\beta$ is within a range specified by $$\gamma_{min} \leq \beta \leq \gamma_{max}$$

where, $\gamma_{min}$ is an angle between a tangent line to the spiral curve of a spiral tooth of the drive gear according to the present invention at a maximum radius that is a radius at a point farthest from the rotation axis, and a line segment perpendicular to the maximum radius, and $\gamma_{max}$ is an angle between a tangent line to the spiral curve of a spiral tooth of the drive gear according to the present invention at a minimum radius that is a radius at a point closest to the rotation axis, and a line segment perpendicular to the minimum radius.

Effects of the Invention

According to the drive gear and the driven gear of the present invention, it is possible to suppress an increase in manufacturing cost and to improve the compatibility of a gear reduction mechanism to an application target thereof, when increasing the diameter of the drive gear.

MODE FOR CARRYING OUT THE INVENTION

First Embodiment

Hereinbelow, a first embodiment for carrying out the present invention will be described in detail with reference to the accompanying drawings.

Figure 1:
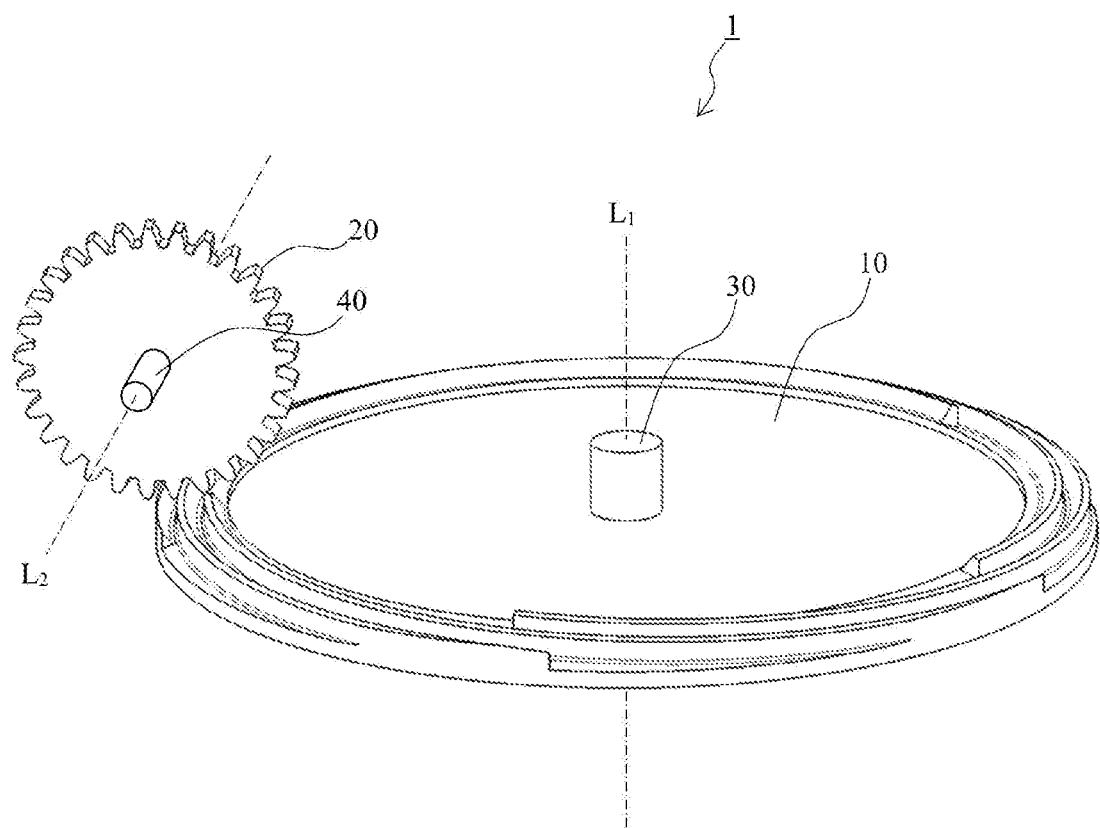
FIG. 1 is a perspective view of the main part of a gear reduction mechanism according to a first embodiment.

FIG. 1 is a perspective view of the main part of a gear reduction mechanism. A gear reduction mechanism 1 is a mechanism that reduces the rotational speed of rotational motion input externally, and outputs rotational motion with the reduced rotational speed, and the gear reduction mechanism 1 includes a drive gear 10 and a driven gear 20 that is driven in mesh with the drive gear 10. In a state in which the drive gear 10 and the driven gear 20 are in mesh, a rotation axis $L_1$ of the drive gear 10 and a rotation axis $L_2$ of the driven gear 20 are arranged to be nonparallel and nonintersecting, that is, noncoplanar. Rotational motion is transmitted to the drive gear 10 from the outside of the gear reduction mechanism 1 through a rotating shaft 30 coaxial with the rotation axis $L_1$. Rotational motion from the outside of the gear reduction mechanism 1 is then transmitted from the drive gear 10 to the driven gear 20, and rotational motion with the reduced rotational speed is output from the gear reduction mechanism 1 through a rotating shaft 40 coaxial with the rotation axis $L_2$ of the driven gear 20. The driven gear 20 has a smaller diameter than that of the drive gear 10. This means that the gear reduction mechanism 1 is configured so that the rotational speed of rotational motion from the outside is reduced due to transmission of the rotational motion from the larger diameter gear to the smaller diameter gear.

Figure 2:
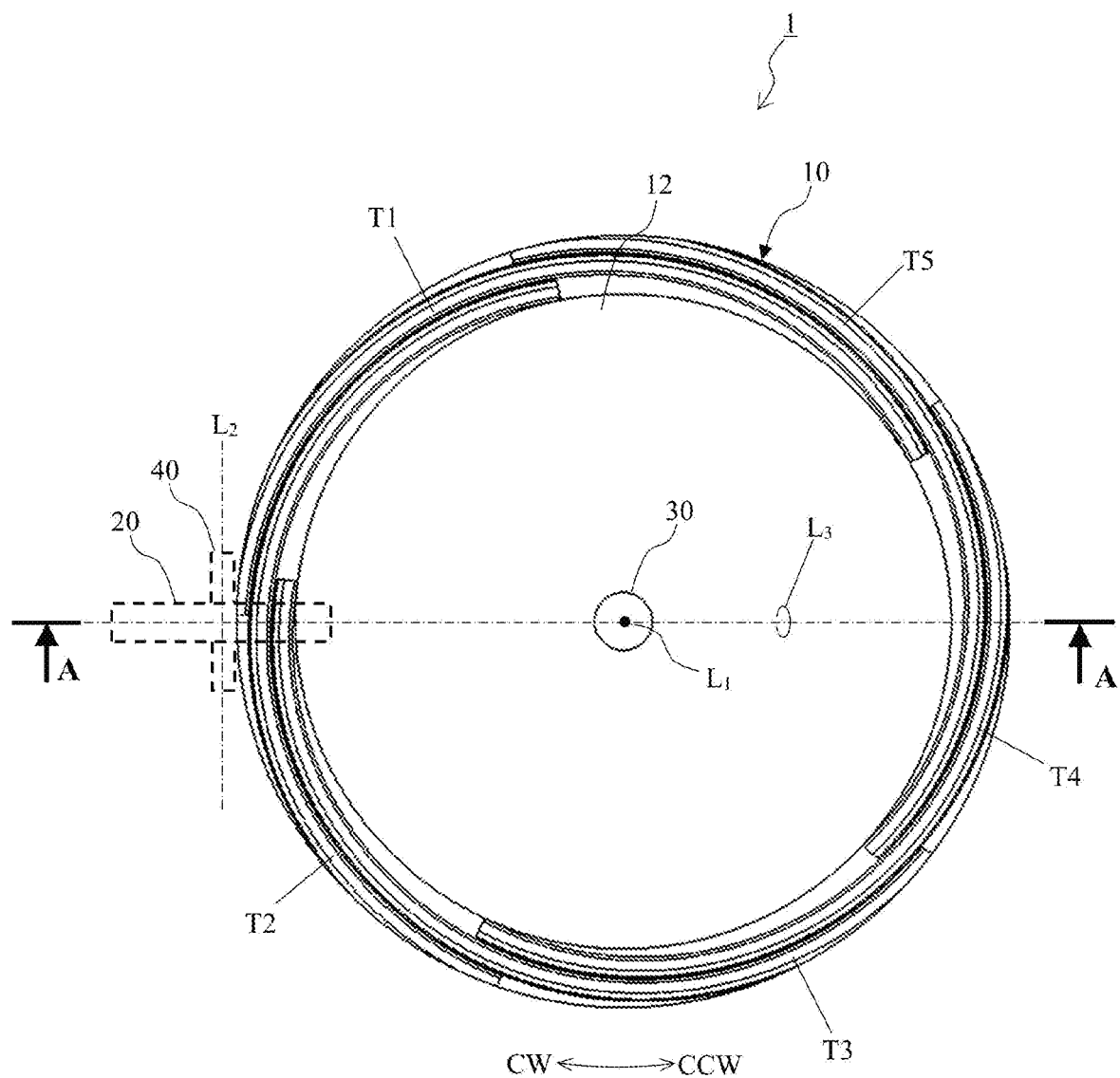
FIG. 2 is a plan view of the main part of the gear reduction mechanism according to the first embodiment.
Figure 3:
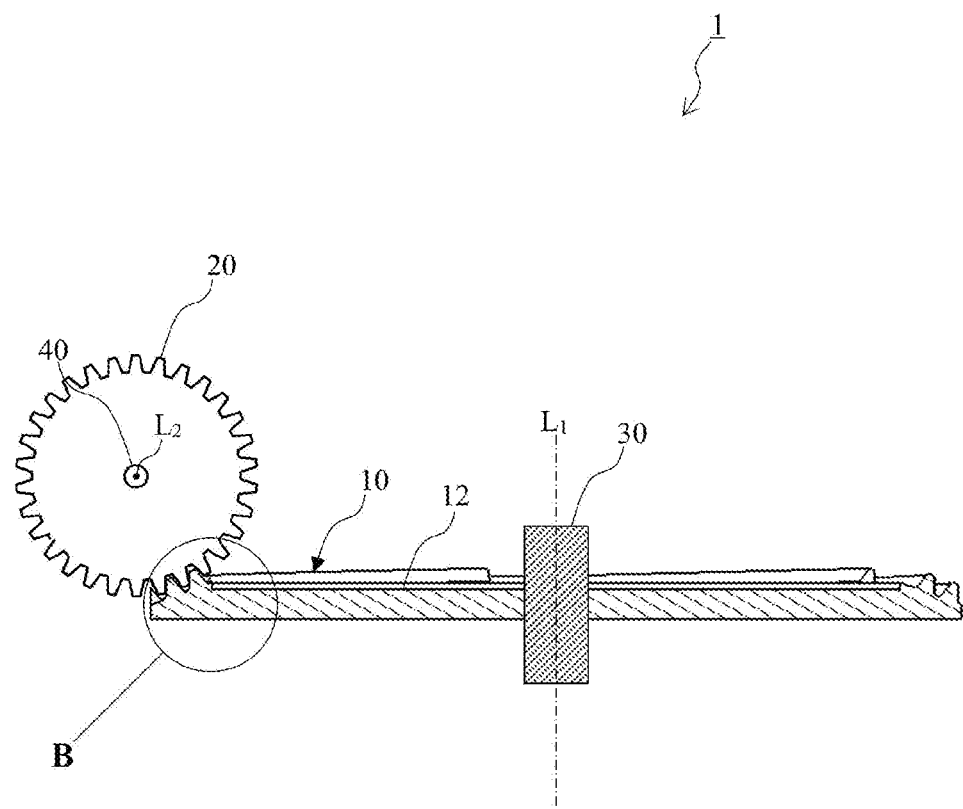
FIG. 3 is a cross-sectional view taken along line A-A of FIG. 2.
Figure 6:
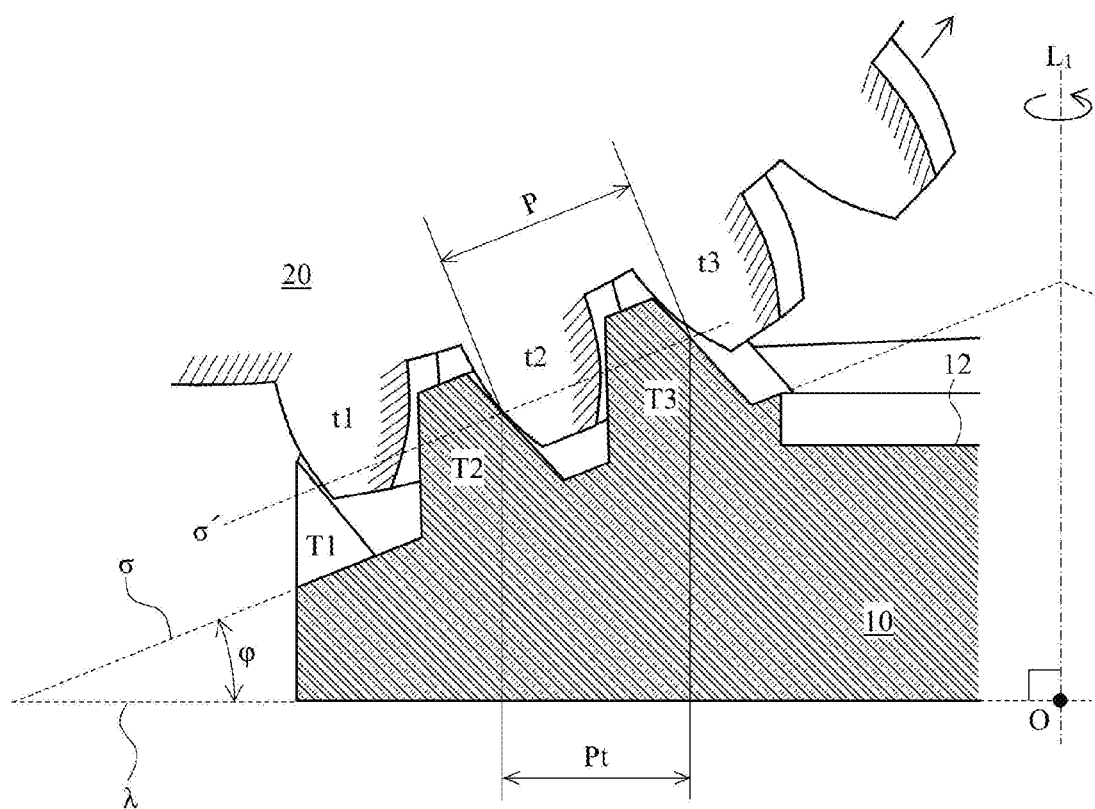
FIG. 6 is an enlarged cross-sectional view of Area B in FIG. 3.
Figure 7:
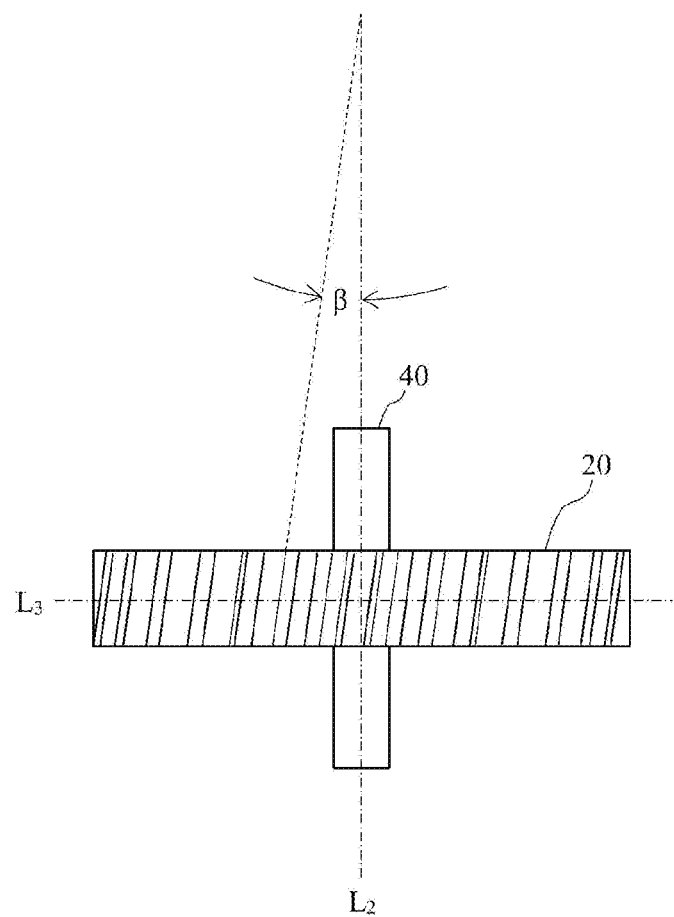
FIG. 7 is a plan view of a driven gear according to the first embodiment.
Figure 8:
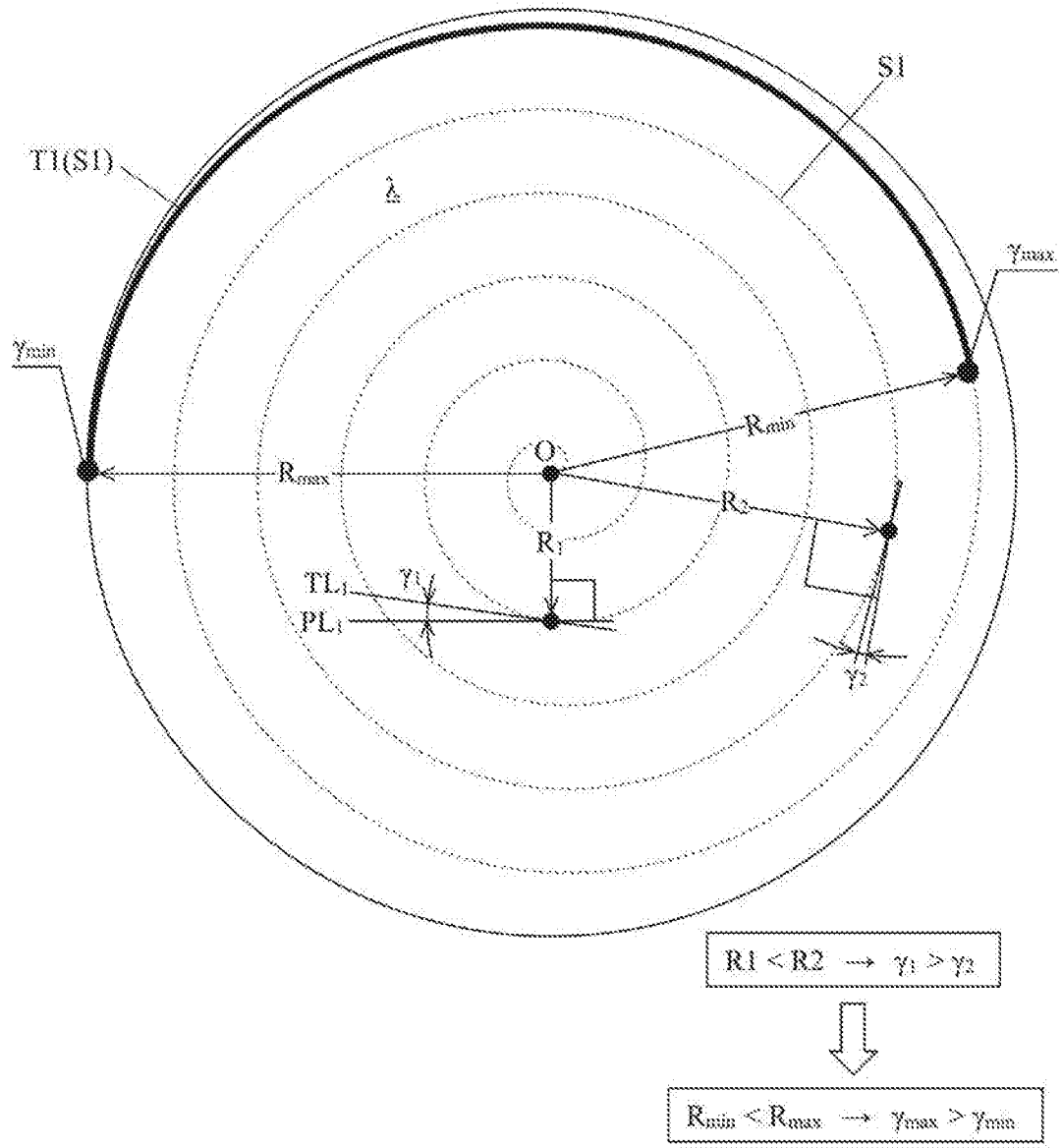
FIG. 8 is a plan view schematically showing a tangent angle of the drive gear according to the first embodiment.

The drive gear 10 and the driven gear 20 will be described in detail with reference to FIGS. 2 to 8. FIG. 2 is a plan view of the main part of the gear reduction mechanism 1. FIG. 3 is a cross-sectional view at the center of the gear reduction mechanism 1. FIGS. 4A to 4E, and 5 are plan views schematically showing the drive gear 10. FIG. 6 is an enlarged cross-sectional view of the main part of the gear reduction mechanism 1. FIG. 7 is a plan view of the driven gear 20. FIG. 8 is a plan view schematically showing a tangent angle of the drive gear 10.

Drive Gear

As shown in FIGS. 2 and 3, the drive gear 10 includes a disc-shaped, rotation transmitting body 12 to which rotational motion is transmitted from the rotating shaft 30. The rotation transmitting body 12 is attached to the rotating shaft 30 coaxially with the rotation axis $L_1$, or is integrally formed with the rotating shaft 30 coaxially with the rotation axis $L_1$. Spiral teeth T1 to T5 that mesh with the teeth of the driven gear 20 are formed so as to protrude, in the axial direction of the rotation axis $L_1$, from a surface all around the periphery of the rotation transmitting body 12.

Figure 4A:
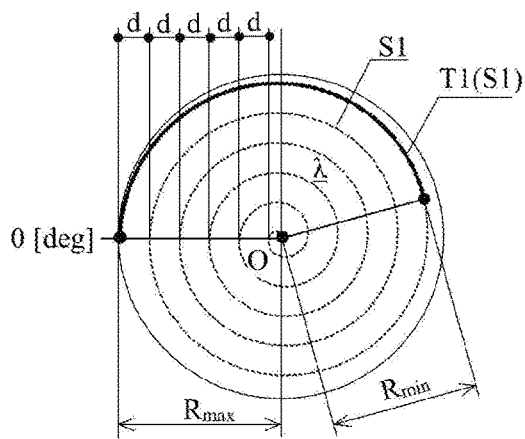
FIGS. 4A to 4E are plan views schematically showing each tooth of a drive gear according to the first embodiment.

In each of FIGS. 4A to 4E, the point of intersection of the plane of rotation λ, which is perpendicular to the rotation axis $L_1$ of the drive gear 10, and the rotation axis $L_1$, is indicated as the origin O, and the tooth traces of spiral teeth T1 to T5 are projected onto the plane of rotation λ in the axial direction of the rotation axis $L_1$. In particular, as shown in FIG. 4A, the tooth trace of one spiral tooth T1 (indicated by a thick line in the figure; the same applies to the other spiral teeth below) is a spiral curve having the spiral center at the origin O and the radial pitch (distance) of constant distance d on the plane of rotation λ. For example, this spiral curve may be an Archimedean spiral or an involute spiral. The drive gear 10 has a planar spiral tooth trace, as compared with a worm having a spiral tooth trace tuning around the outer peripheral surface of a cylinder, and thus, the drive gear 10 can be called a spiral face gear.

As shown in FIG. 4A, one spiral tooth T1 extends along a spiral curve S1 on the plane of rotation λ from a point at which a radius R of the spiral curve S1 is a predetermined maximum radius Rmax to a point at which a radius R of the spiral curve S1 is a predetermined minimum radius Rmin (<Rmax). In addition to this spiral tooth T1, spiral teeth T2 to T5 are formed on the rotation transmitting body 12. However, each of the spiral teeth T1 to T5 has a different tooth trace of the spiral curve S1 to S5 on the plane of rotation λ. The spiral curves S2 to S5 are obtained by copying the spiral curve S1 that defines the tooth trace of one spiral tooth T1, and by rotating at even angular intervals around the origin O depending on the number of spiral teeth (five in this embodiment).

Figure 4B:
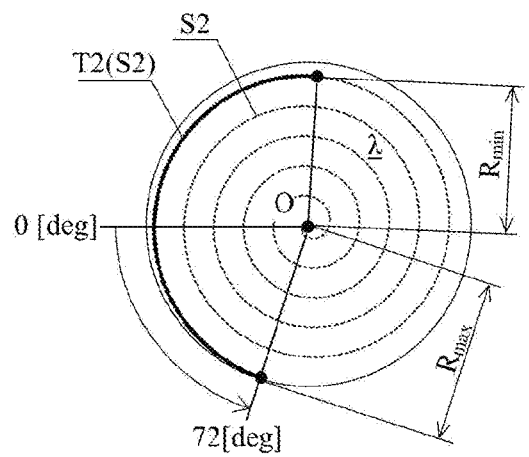
Figure 4C:
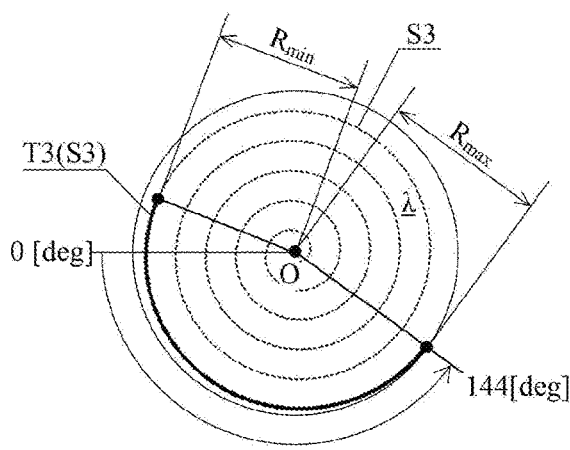
Figure 4D:
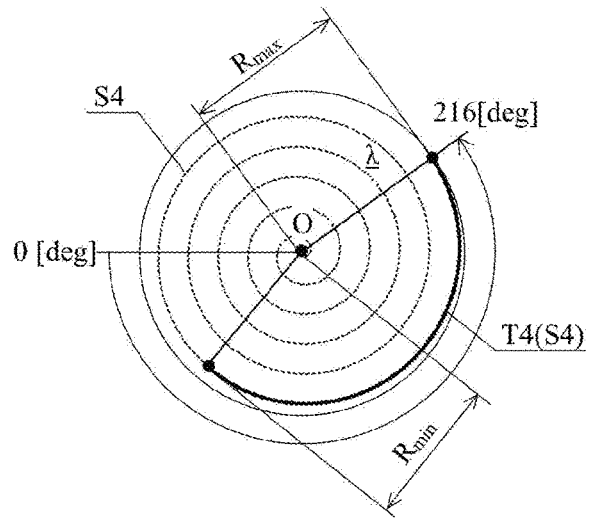
Figure 4E:
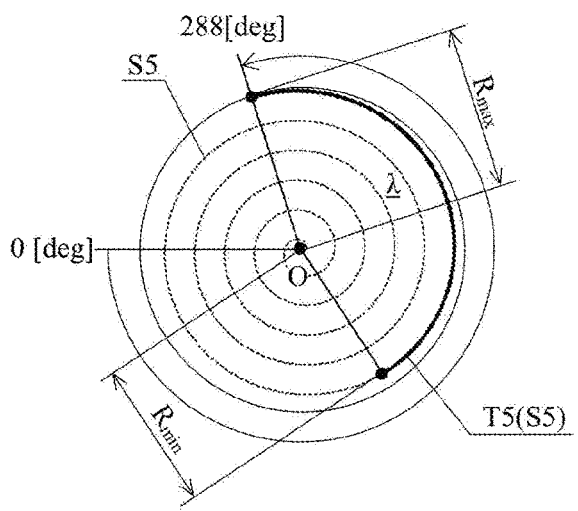

Specifically, the spiral curve S2 that defines the tooth trace of the spiral tooth T2 in FIG. 4B is obtained by copying the spiral curve S1 that defines the tooth trace of the spiral tooth T1 in FIG. 4A, and by rotating it by 360/5 degrees, that is, 72 degrees, around the origin O. The spiral curve S3 that defines the tooth trace of the spiral tooth T3 in FIG. 4C is obtained by copying the spiral curve S1 that defines the tooth trace of the spiral tooth T1 in FIG. 4A, and by rotating it by 72×2 degrees, that is, 144 degrees, around the origin O. The spiral curve S4 that defines the tooth trace of the spiral tooth T4 in FIG. 4D is obtained by copying the spiral curve S1 that defines the tooth trace of the spiral tooth T1 in FIG. 4A, and by rotating it by 72×3 degrees, that is, 216 degrees, around the origin O. The spiral curve S5 that defines the tooth trace of the spiral tooth T5 in FIG. 4E is obtained by copying the spiral curve S1 that defines the tooth trace of the spiral tooth T1 in FIG. 4A, and by rotating it by 72×4 degrees, that is, 288 degrees, around the origin O.

Similar to the spiral tooth T1, the spiral tooth T2 extends along the spiral curve S2 on the plane of rotation λ, from a point at which the radius R of the spiral curve S2 is a predetermined maximum radius Rmax to a point at which the radius R of the spiral curve S2 is a predetermined minimum radius Rmin. The same applies to the spiral teeth T3 to T5.

Figure 5:
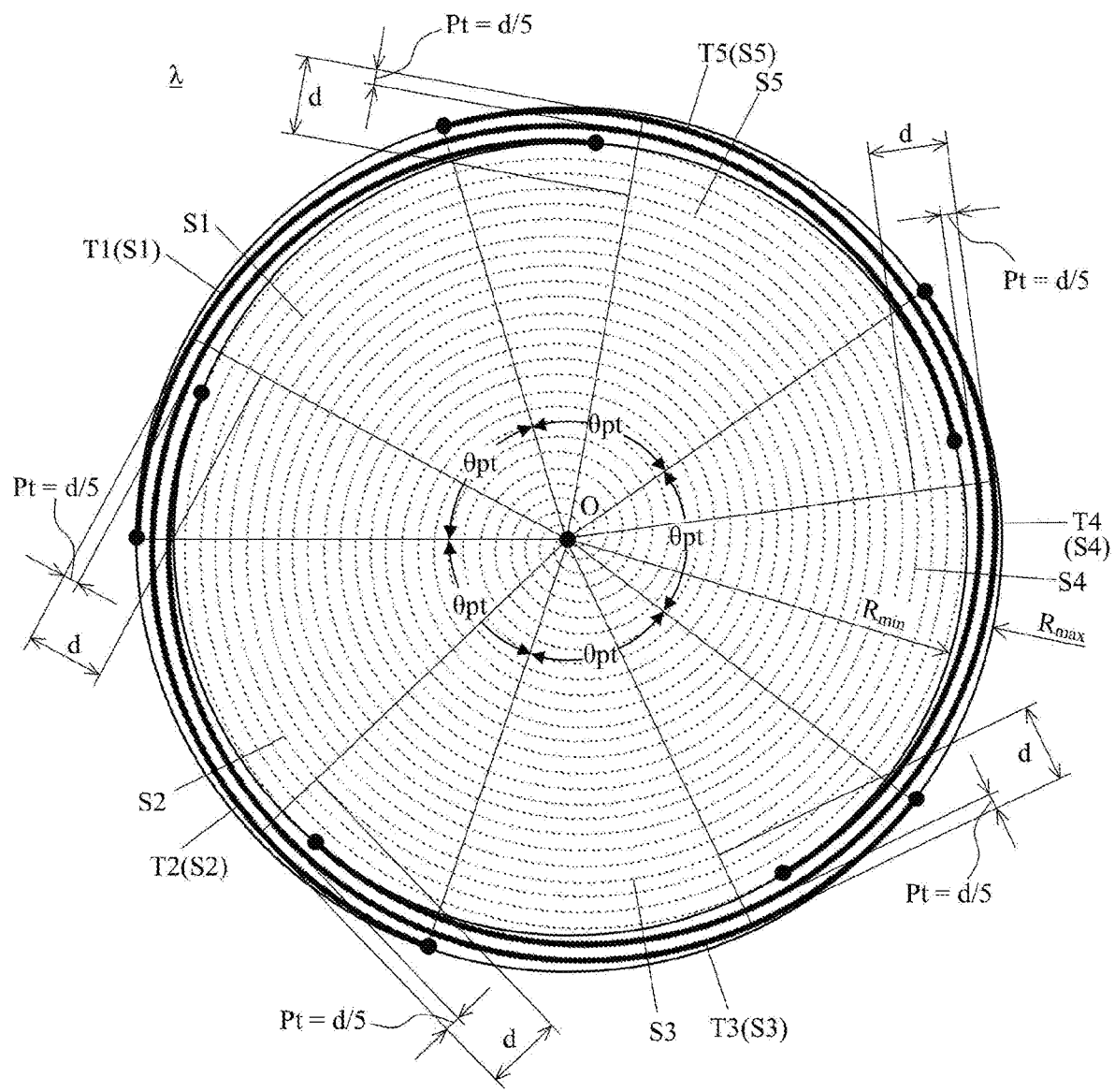
FIG. 5 is a plan view schematically showing the drive gear according to the first embodiment.

As shown in FIG. 5, each of the spiral curves S1 to S5 is a spiral curve having the spiral center at the origin O and the radial pitch (distance) of the constant distance d on the plane of rotation λ, and spiral curves S1 to S5 are obtained by copying one spiral curve and by rotating it at even angular intervals around the origin O. Therefore, a radial pitch Pt of the spiral curves S1 to S5 becomes a constant distance (d/5). The pitch Pt is nothing but the radial pitch of the spiral teeth T1 to T5 when the spiral teeth T1 to T5 are formed to protrude from a surface parallel to the plane of rotation λ.

In the periphery of the rotation transmitting body 12, the spiral teeth T1 to T5 may be formed to protrude from a surface parallel to the plane of rotation λ, or alternatively, may be formed to protrude from a conical surface σ of a cone having the axis coinciding with the rotation axis $L_1$ of the drive gear 10, as shown in FIG. 6. When the spiral teeth T1 to T5 are formed to protrude from the conical surface σ, the spiral teeth T1 to T5 are formed along curves obtained by projecting the spiral curves S1 to S5 on the plane of rotation λ, onto the conical surface σ in an axial direction of the rotation axis $L_1$. If φ radians is an angle between the plane of rotation λ, and the conical surface σ, then the pitch P of the spiral teeth T1 to T5 on a pitch conical surface σ' is calculated by a relational expression, P=Pt/cos φ, using the radial pitch Pt of the spiral curves S1 to S5 on the plane of rotation λ. The pitch conical surface σ' indicates the positions at which the spiral teeth T1 to T5 mesh with the teeth of the driven gear 20, and is a conical surface at a constant distance from the conical surface σ.

However, the angle φ between the plane of rotation λ, and the conical surface σ is set within a range in which no undercut-shaped portion is formed on the spiral teeth T1 to T5 formed on the conical surface σ when the drive gear 10 is injection-molded by a mold that is divided in the axial direction of the rotation axis $L_1$ (for example, at the plane of rotation λ). The undercut-shaped portion has a shape that requires, for example, a slide core that slides along a direction other than the axial direction of the rotation axis $L_1$, in addition to a mold divided in the axial direction of the rotation axis $L_1$. The details of a method for setting the tooth traces of the spiral teeth of the drive gear 10 will be described later.

Driven Gear

Referring again to FIG. 2, in the gear reduction mechanism 1, when the driven gear 20 is arranged in mesh with the drive gear 10, a tooth width center line $L_3$ perpendicular to the rotation axis $L_2$ of the driven gear 20 intersects the rotation axis $L_1$ of the drive gear 10. As shown in FIG. 7, a helical gear having a predetermined helix angle β with respect to the rotation axis $L_2$ is used as the driven gear 20. The reasons for this are as follows.

That is, in the drive gear 10, a tangent angle γ, which is an angle between a tangent line to a spiral curve S1 to S5 defining the tooth trace of the corresponding spiral tooth T1 to T5, at a given radius R, and a line segment perpendicular to the radius R, does not become zero, due to the nature of the spiral curves. For example, as shown in the plane of rotation λ, in FIG. 8, a tangent angle $γ_1$, which is an angle between a tangent line $TL_1$ to the spiral curve S1 at a given radius $R_1$, and an orthogonal line $PL_1$ perpendicular to the radius $R_1$, is not zero. Therefore, the tangent angle γ at the point of intersection of the tooth width center line $L_3$ of the driven gear 20, which is projected onto the plane of rotation λ, of the drive gear 10 in the axial direction of the rotation axis $L_1$, and the spiral curves S1 to S5 is not zero. Therefore, as the driven gear 20, a helical gear having a predetermined helix angle β with respect to the rotation axis $L_2$ is used, considering the tangent angle γ of the spiral curves S1 to S5. The details of a method for setting the helix angle β of the driven gear 20 will be described later.

Furthermore, crowning is performed on the driven gear 20 such that the center of the tooth width expands in the tooth thickness direction with respect to both ends of the tooth width, to have the center of the tooth width of the driven gear 20 contact the spiral teeth T1 to T5 when meshing with the drive gear 10. An expanding amount at the center of the tooth width provided by the crowning is called the magnitude of crowning. The details of a method for setting the crowning magnitude of the driven gear 20 will be described later.

Operation of Drive Gear and Driven Gear

Next, the operation of the drive gear 10 and the driven gear 20 will be described. Here, the drive gear 10 is assumed to rotate counterclockwise (CCW), as shown in FIG. 2. Furthermore, the spiral curves S1 to S5 that define the tooth traces of the spiral teeth T1 to T5 are assumed to be left-handed, that is, the curves start from the origin O and has the radius gradually increasing in the counterclockwise direction.

In FIG. 6, it is assumed that the spiral tooth T2 of the drive gear 10 and the tooth t2 of the driven gear 20 are in mesh, and the spiral tooth T3 of the drive gear 10 and the tooth t3 of the driven gear 20 are in mesh. As the drive gear 10 rotates counterclockwise, the spiral tooth T2 and the tooth t2 slide, and the spiral tooth T3 and the tooth t3 slide. Furthermore, as the drive gear 10 rotates counterclockwise, the radius of the spiral curve S2 at the point at which the spiral tooth T2 and the tooth t2 are in mesh, and the radius of the spiral curve S3 at the point at which the spiral tooth T3 and the tooth t3 are in mesh, decrease gradually. Therefore, the driven gear 20 rotates counterclockwise when viewed in the direction shown in the figure.

The spiral tooth T3 ends at a point at which the radius R of the spiral tooth T3 becomes the predetermined minimum radius Rmin, and thus, the meshing between the spiral tooth T3 and the tooth t3 ends. At the end or before the end of the meshing, the spiral tooth T1 and the tooth t1 starts meshing. In this way, when the drive gear 10 makes one rotation in the counterclockwise direction, the driven gear 20 rotates by an angle corresponding to five teeth.

Method for Setting Tooth Traces of Spiral Teeth of Drive Gear

Next, the method for setting the tooth traces of the spiral teeth of the drive gear 10 will be described. As a premise of setting the tooth traces of the spiral teeth of the drive gear 10, it is assumed that the driven gear 20 rotates y radians when the drive gear 10 rotates x radians, and the spiral teeth are formed to protrude from the conical surface σ, which forms the angle φ with the plane of rotation λ.

When an Archimedean spiral is employed for the spiral curve defining the tooth trace of each spiral tooth, the spiral curve is expressed by the following equation of polar coordinates based on the radius R from the origin O, which is the center of the spiral, and an angle θ at the origin O. Here, a is a constant.

$$R = a \times \theta \quad (1)$$

If Z denotes the number of teeth of the driven gear 20, the number of teeth Zy corresponding to the angle y radians is expressed by the following equation.

$$Zy = Z \times (y/2\pi) \quad (2)$$

Furthermore, the radial pitch Pt of the spiral curves on the plane of rotation λ of the drive gear 10 is expressed by the following equation using the pitch P of the spiral teeth on the pitch conical surface σ' of the drive gear 10, and the angle φ between the plane of rotation λ and the conical surface σ.

$$Pt = P \times \cos \varphi \quad (3)$$

If the module of the drive gear 10 is known as m, then Equation (3) can be rewritten as follows.

$$Pt = \pi \times m \times \cos \varphi \quad (4)$$

When the drive gear 10 rotates x radians, and the driven gear 20 rotates y radians, if a point at which the drive gear 10 and the driven gear 20 are in mesh is displaced by Rxy in the radial direction, the displacement Rxy is expressed by the following equation using Equations (2) and (4).

$$Rxy = Zy \times Pt = Z \times m \times y \times \cos \varphi / 2 \quad (5)$$

On the other hand, the displacement Rxy is expressed by the following equation using Equation (1).

$$Rxy = a \times x \quad (6)$$

Therefore, the constant a of Equation (1) can be obtained by the following equation from Equations (5) and (6).

$$a = Z \times m \times (y/x) \times \cos \varphi / 2 \quad (7)$$

Therefore, the spiral curves are set by copying the spiral curve of Equation (1) determined by the constant a obtained by Equation (7), and by rotating it around the origin O, such that the radial pitch on the plane of rotation λ becomes Pt. Then, the curves obtained by projecting the spiral curves on the plane of rotation λ onto the conical surface σ in the axial direction of the rotation axis $L_1$ defines the tooth traces of spiral teeth on the conical surface σ. When the spiral teeth are formed to protrude from a surface parallel to the plane of rotation λ, the angle φ in the above equation may be set to 0 radians to obtain the constant a.

However, the gear cannot be realized unless spiral curves are arranged at even angular intervals around the origin O when the spiral curve of Equation (1) determined by the constant a is copied and rotated around the origin O. Therefore, the angle for one rotation (i.e., 2π radians) of the drive gear 10 needs to be divisible by the circumferential pitch θpt (see FIG. 5), which is the amount of angular change when the radius R changes by one pitch Pt on the spiral curve. Therefore, when n denotes the number of spiral teeth, it is necessary to satisfy the following equation.

$$2\pi/\theta pt = n \text{ (where, } n \text{ is an integer of 2 or more)} \quad (8)$$

Here, an angular pitch θpt of the spiral teeth is expressed by the following equation using Equation (1).

$$\theta pt = Pt/a \quad (9)$$

When Equation (8) is transformed using Equations (9), (4), and (7), the following equation is obtained.

$$2\pi \times a/Pt = Z \times (y/x) = n \text{ (where, } n \text{ is an integer of 2 or more)} \quad (10)$$

Hereinafter, it is assumed that the tooth traces of the five spiral teeth T1 to T5 defined by the spiral curves S1 to S5 could be set because it was able to calculate the constant a to satisfy n=5.

Although the tooth traces of the spiral teeth T1 to T5 is set as described above, it is further necessary to set a range in which the spiral teeth T1 to T5 extend along the tooth traces. Specifically, it is necessary to set the abovementioned maximum radius Rmax and minimum radius Rmin. The maximum radius Rmax is set depending on the outermost diameter of the rotation transmitting body 12 (drive gear 10). For example, the maximum radius Rmax may be made equal to the outermost diameter of the rotation transmitting body 12.

On the other hand, the minimum radius Rmin is set depending on the required amount of overlap between adjacent spiral teeth in the circumferential direction. The required amount of overlap is set based on the required meshing ratio between the drive gear 10 and the driven gear 20. A condition for achieving the meshing ratio of 1 or more between a rack and a pinion may apply to the calculation of the required meshing ratio between the drive gear 10 and the driven gear 20.

The required amount of overlap between adjacent spiral teeth in the circumferential direction may be set as follows, for example. Referring again to FIG. 6, it is assumed that, while the drive gear 10 rotates counterclockwise, the spiral tooth T2 of the drive gear 10 and the tooth t2 of the driven gear 20 are in mesh, and the spiral tooth T3 of the drive gear 10 and the tooth t3 of the driven gear 20 are in mesh. In this case, there is concern that if the spiral tooth T3 meshing with the tooth t3 of the driven gear 20 ends, and the next spiral tooth T1 is not meshing with the tooth t1, rotational motion of the drive gear 10 cannot be smoothly transmitted to the driven gear 20. Therefore, at least two of the spiral teeth T1 to T5 of the drive gear 10 need to overlap in the radial direction at any angle around the rotation axis $L_1$. Based on this condition, the required amount of overlap is set, and depending on this amount, the minimum radius Rmin is set.

Method for Setting Helix Angle of Driven Gear

As described above, as the driven gear 20, a helical gear having a predetermined helix angle β is used in consideration of the tangent angle γ. Therefore, it is necessary to obtain the tangent angle γ at the point of intersection of the tooth width center line $L_3$ of the driven gear 20, projected onto the plane of rotation λ of the drive gear 10, and the spiral curves S1 to S5.

Figure 9:
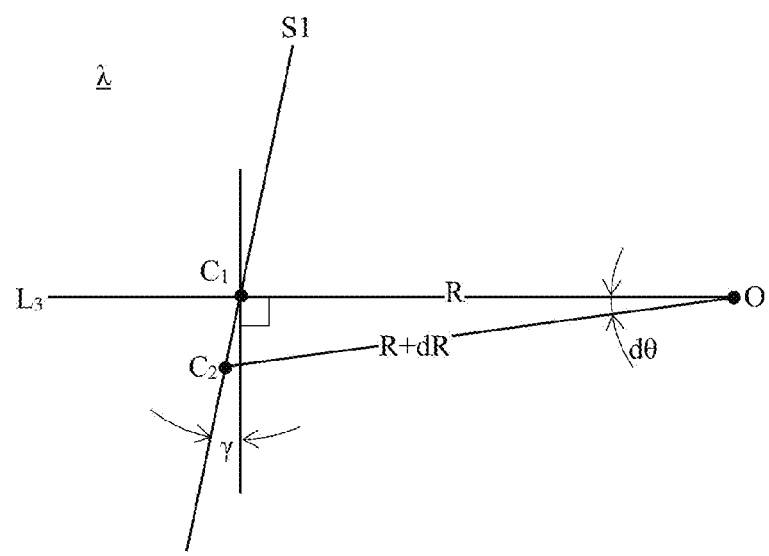
FIG. 9 is an explanatory view for explaining a method for calculating the tangent angle according to the first embodiment.

FIG. 9 is an explanatory view for explaining a method for calculating the tangent angle γ. When point $C_1$ is one point of intersection of the tooth width center line $L_3$ of the driven gear 20, projected onto the plane of rotation λ, of the drive gear 10, and the spiral curve S1, the radius R of the spiral curve S1 at the point of intersection $C_1$ corresponds to a distance between O and $C_1$. When point $C_2$ is a point obtained by moving point $C_1$ by a minute angle dθ around the origin O along the spiral curve S1 from point $C_1$, the radius (R+dR) of the spiral curve S1 at point $C_2$ corresponds to a distance between O and $C_2$. The tangent angle γ at point $C_1$ is expressed by the following equation of tangent.

$$\tan \gamma = (R + dR - R)/(d\theta \times R) = dR/(d\theta \times R) \quad (11)$$

Here, the spiral curve S1 is expressed by R=a×θ in Equation (1), and Equation (1) can be transformed into dR/dθ=a. Therefore, Equation (11) can be rewritten as:

$$\tan \gamma = a/R \quad (12)$$

Referring again to FIG. 8, the relationship between the tangent angle $\gamma_1$ (=a tan(a/$R_1$)) at the radius $R_1$ on the spiral curve S1, and the tangent angle $\gamma_2$ (=a tan(a/$R_2$)) at the radius $R_2$ on the same spiral curve S1 is $\gamma_1 > \gamma_2$, because $R_1 < R_2$ is satisfied. Also, for the spiral tooth T1 in the range from the maximum radius Rmax to the minimum radius Rmin, the tangent angle γ has the minimum value γmin at the maximum radius Rmax, and the tangent angle γ has the maximum value γmax at the minimum radius Rmin. This applies not only to the spiral tooth T1, but also to the spiral teeth T2 to T5. Therefore, the helix angle β of the driven gear 20 meshing with the spiral teeth T1 to T5 needs to be set to a value that satisfies the following relationship in order to adapt to the tangent angle γ that changes momentarily as the drive gear 10 rotates.

$$\gamma min \leq \beta \leq \gamma max \quad (13)$$

Method for Setting Crowning Magnitude of Driven Gear

As described above, the tangent angle γ of the spiral teeth T1 to T5 has the maximum value γmax when the spiral teeth T1 to T5 have the minimum radius Rmin. Therefore, during meshing of the driven gear 20 with the spiral teeth T1 to T5, a timing at which a tooth width direction end of the driven gear 20 is more likely to come into contact with the spiral teeth T1 to T5 is a timing at which the drive gear 10 rotates until a point at which the spiral teeth T1 to T5 of the drive gear 10 has the minimum radius Rmin reaches the driven gear 20. Therefore, the crowning magnitude of the driven gear 20 is set based on the contact state of the tooth width direction end at the time of meshing of the teeth of the driven gear 20 with the spiral teeth T1 to T5 at the minimum radius Rmin.

Figure 10:
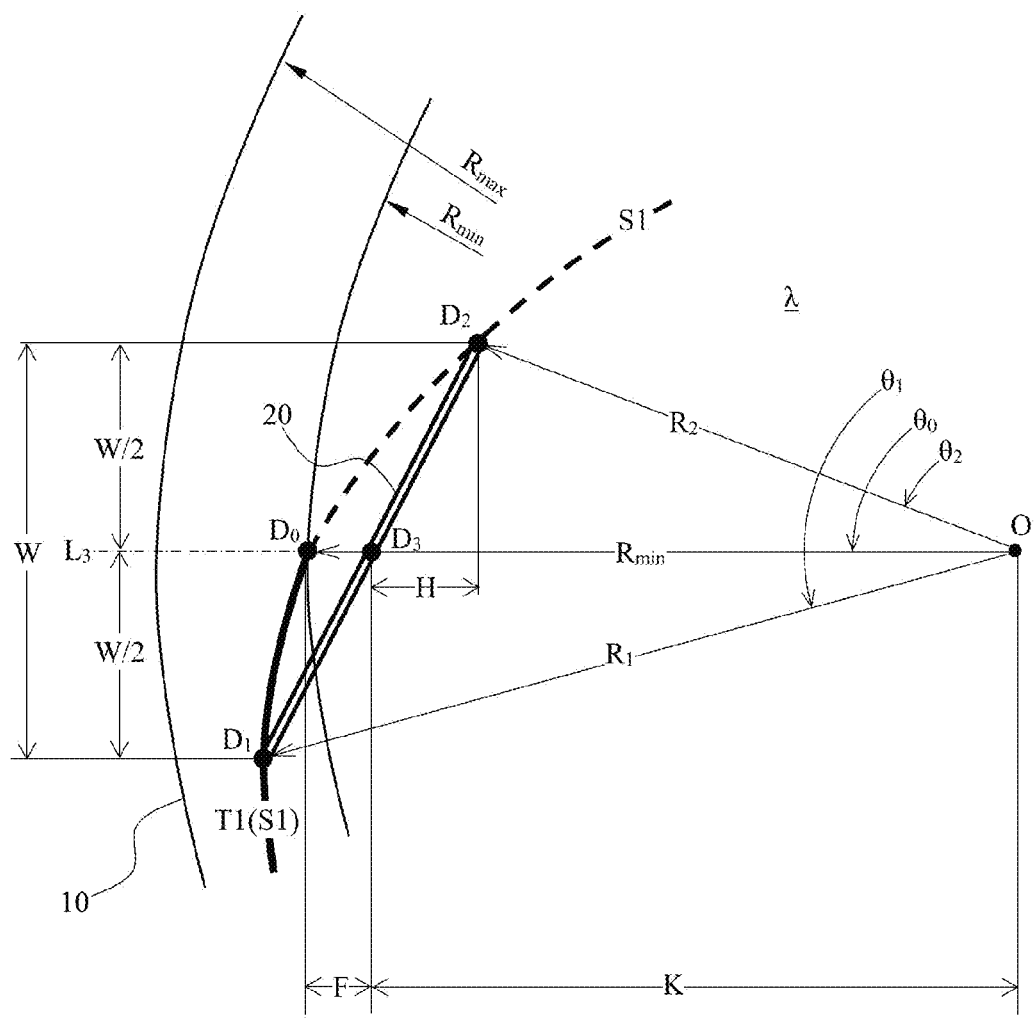
FIG. 10 is a plan view for explaining a method for setting the magnitude of crowning according to the first embodiment.

FIG. 10 is a plan view schematically showing, on the plane of rotation λ, a point at which the spiral tooth T1 meshes at the minimum radius Rmin with the tooth of the driven gear 20. In FIG. 10, the tooth width center line $L_3$ of the driven gear 20 having teeth of the tooth width W (indicated by a double line in the figure) passes through point Do at which the spiral curve S1 of the spiral teeth T1 has the minimum radius Rmin, when the tooth width center line $L_3$ is projected onto the plane of rotation λ in the axial direction of the rotation axis $L_1$. Furthermore, it is assumed that one end of the driven gear 20 in the tooth width direction is located on the spiral curve S1 at point $D_1$, and the spiral curve S1 has a radius $R_1$ at point $D_1$. It is also assumed that when the spiral tooth T1 extends toward the origin O beyond the point of the minimum radius Rmin, the other end of the driven gear 20 in the tooth width direction is located on the spiral curve S1 at point $D_2$, and the spiral curve S1 has a radius $R_2$ at point $D_2$. A point of intersection of the line segment connecting points $D_1$ and $D_2$ and the tooth width center line $L_3$ of the driven gear 20 is tooth width center point $D_3$, and F denotes a distance between tooth width center point $D_3$ and point Do of the spiral tooth T1, that is, $D_0$-$D_3$ distance.

In order to prevent one end of the driven gear 20 in the tooth width direction from contacting the spiral tooth T1, the crowning magnitude δ of the driven gear 20 needs to be greater than the $D_0$-$D_3$ distance F. Therefore, a method for obtaining the $D_0$-$D_3$ distance F will be described.

First, the following equation is established between an angle $\theta_1$, at the origin O, of the radius $R_1$ connecting point $D_1$, and an angle $\theta_0$, at the origin O, of the radius Rmin connecting point $D_0$.

$$R_1 \times \sin(\theta_1 - \theta_0) = W/2 \quad (14)$$

According to Equation (1), since $R_1 = a \times \theta_1$ and Rmin = a × $\theta_0$ are established, Equation (14) can be rewritten as follows.

$$a \times \theta_1 \times \sin(\theta_1 - R\ min/a) = W/2 \quad (15)$$

Since the minimum radius Rmin, the constant a, and the tooth width W are known values, the angle $\theta_1$ can be obtained by substituting these values into Equation (15).

Furthermore, the following equation is established between an angle $\theta_2$, at the origin O, of the radius $R_2$ connecting point $D_2$, and the angle $\theta_0$, at the origin O, of the radius Rmin connecting point $D_0$.

$$R_2 \times \sin(\theta_0 - \theta_2) = W/2 \quad (16)$$

According to Equation (1), since $R_2 = a \times \theta_2$ and Rmin = a × $\theta_0$ are established, Equation (16) can be rewritten as follows.

$$a \times \theta_2 \times \sin(\theta_2 - R\ min/a) = W/2 \quad (17)$$

Since the minimum radius Rmin, the constant a, and the tooth width W are known values, the angle $\theta_2$ can be obtained by substituting these values into Equation (17).

On the other hand, a distance H in the figure is calculated by the following equation.

$$H = \{R_1 \times \cos(\theta_1 - \theta_0) - R_2 \times \cos(\theta_0 - \theta_2)\}/2 \quad (18)$$

Furthermore, a distance K in the figure is calculated by the following equation.

$$K = H + R_2 \times \cos(\theta_0 - \theta_2) \quad (19)$$

Therefore, the $D_0$-$D_3$ distance F is calculated by the following equation as a value obtained by subtracting the distance K from the minimum radius Rmin.

$$F = R\ min - K \quad (20)$$

Then, the crowning magnitude δ of the driven gear 20 is set to a value greater than the $D_0$-$D_3$ distance F obtained by Equation (20). More specifically, the crowning magnitude δ is set in a range of F<δ<F+α, considering a machining tolerance α, and it is preferable that the machining tolerance α be as small as possible in order to decrease the tooth surface pressure.

Thus, in the gear reduction mechanism 1 according to the first embodiment as described above, since the spiral face gear having the tooth traces set as described above is used as the drive gear 10, the driven gear 20 is able to mesh with the drive gear 10 in the axial direction of the rotation axis $L_1$. Therefore, even in a case in which there is not enough space in the radial direction of the drive gear 10 in an application target of the gear reduction mechanism 1 when increasing the diameter of the drive gear 10, it is possible to easily adapt it to the application target.

Furthermore, regarding the drive gear 10, it is possible to form the drive gear 10 by injection-molding using a mold divided in the axial direction of the rotation axis $L_1$, and thus, there is no need for rotation removal, unlike resin molding of a worm. Therefore, it is possible to suppress an increase in manufacturing cost as compared with a worm even when increasing the diameter of the drive gear 10.

Then, since the methods for setting the design parameters for the spiral teeth T1 to T5 of the drive gear 10 and the teeth of the driven gear 20 meshing the spiral teeth T1 to T5 are specifically described, it is possible to smoothly and accurately transmit rotational motion of the drive gear 10 to the meshing driven gear 20.

Second Embodiment

Next, a second embodiment for carrying out the present invention will be described in detail with reference to FIGS. 11 to 13. Hereinbelow, differences from the first embodiment will be described. The same reference symbols are given to the same components as those in the first embodiment, and descriptions thereof will be omitted or simplified.

Figure 11:
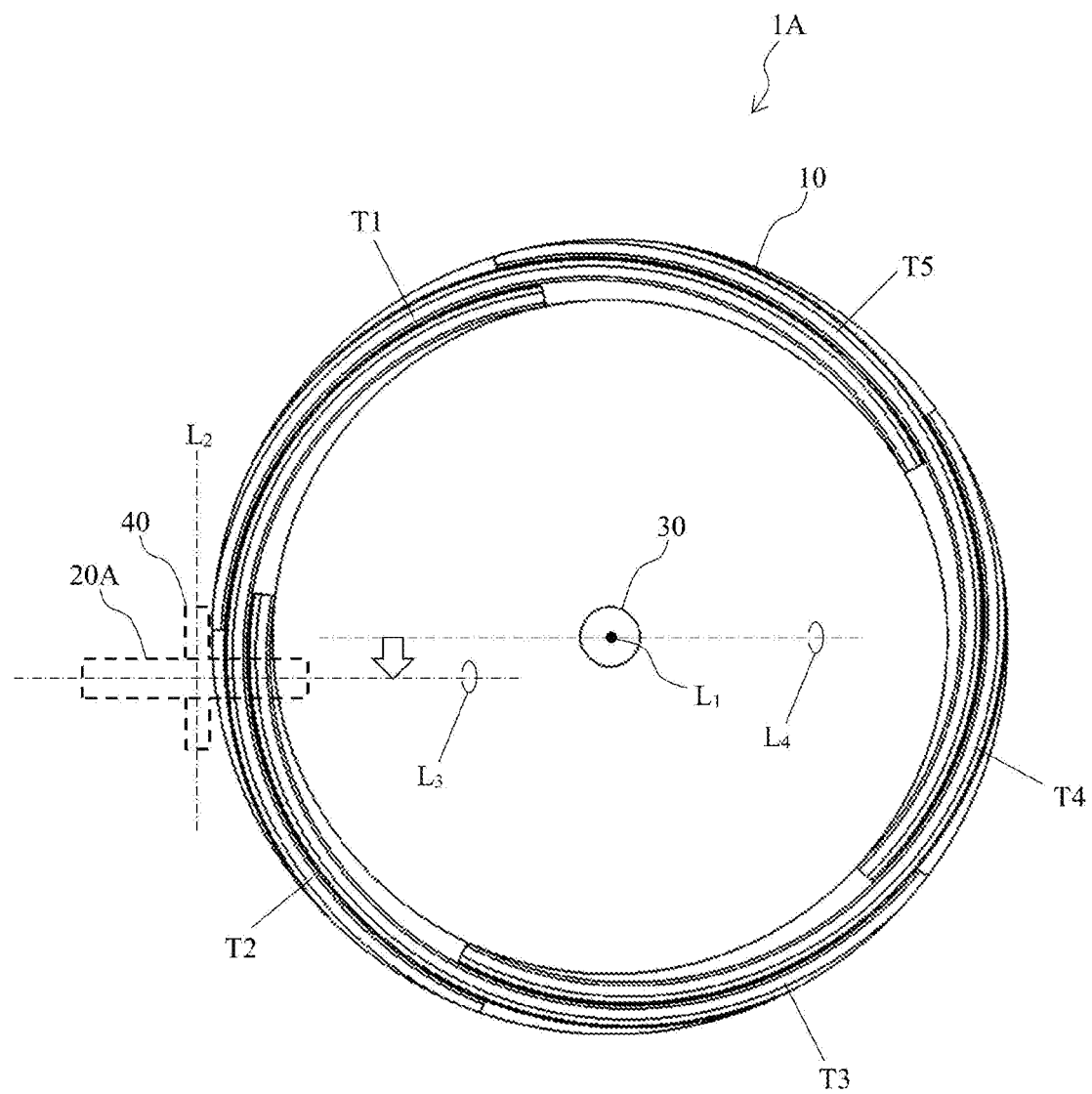
FIG. 11 is a plan view of the main part of a gear reduction mechanism according to a second embodiment.
Figure 12:
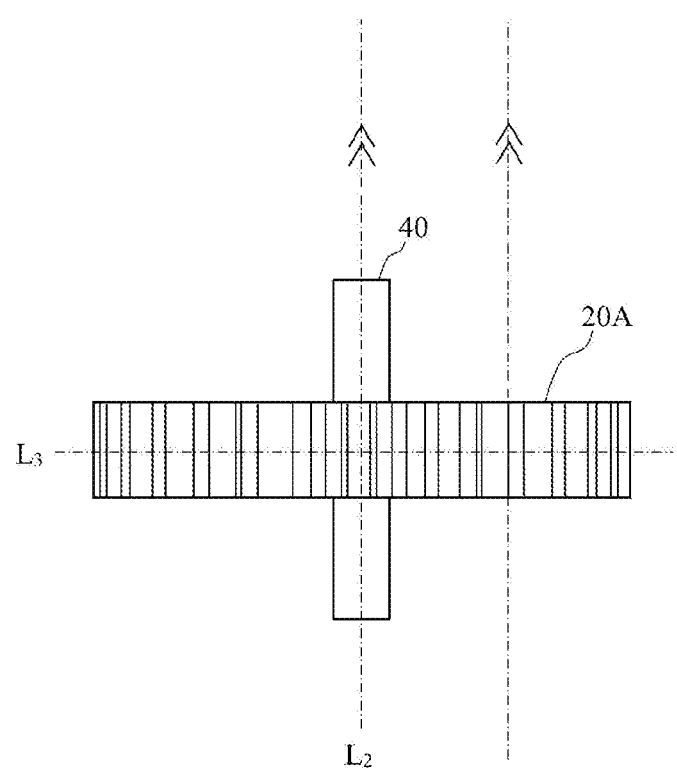
FIG. 12 is a plan view of a driven gear according to the second embodiment.

FIG. 11 is a plan view of the main part of a gear reduction mechanism. The second embodiment is different from the first embodiment in that, when a driven gear 20A is arranged in mesh with the drive gear 10 in a gear reduction mechanism 1A, a tooth width center line $L_3$ of the driven gear 20A does not intersect the rotation axis $L_1$, and is displaced in parallel from a perpendicular line segment $L_4$ perpendicular to the rotational axis $L_1$. When an amount of parallel displacement satisfies a predetermined condition, a spur gear having tooth traces parallel to the rotation axis $L_2$, that is, perpendicular to the tooth width center line $L_3$, is used as the driven gear 20A, as shown in FIG. 12. In other words, the helix angle β of the helical gear used as the driven gear 20 in the first embodiment may be made zero.

Figure 13:
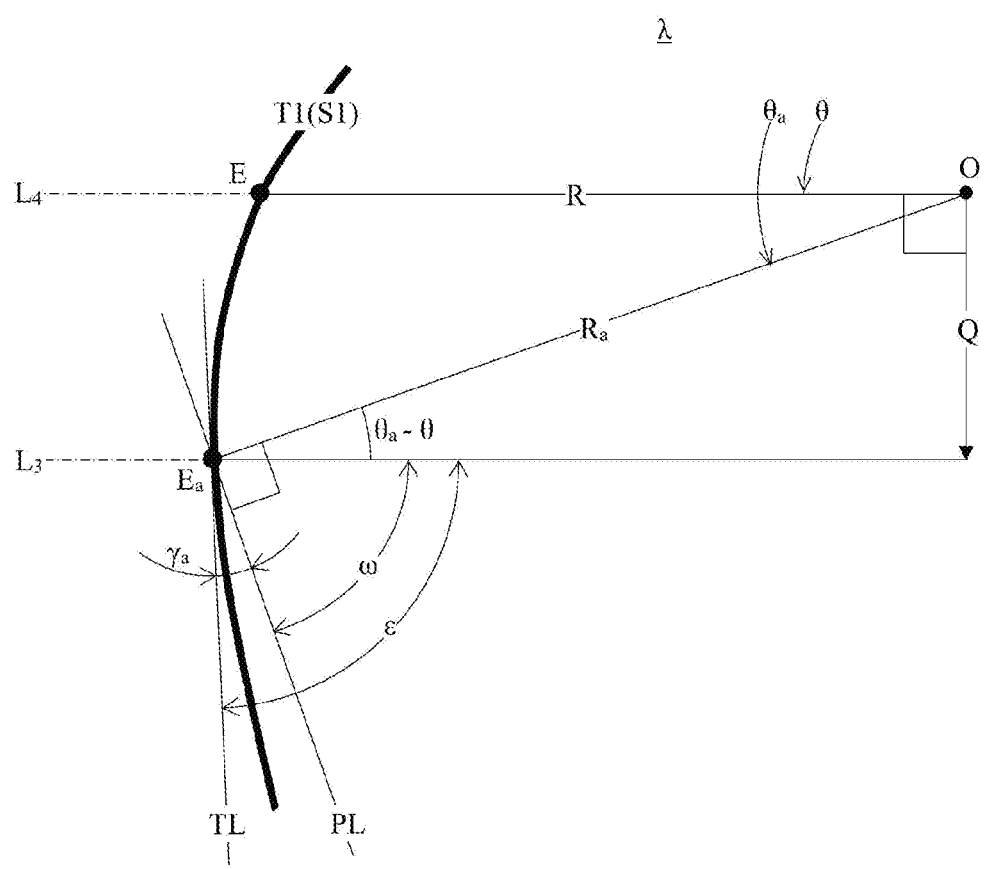
FIG. 13 is a plan view for schematically explaining a driven gear, which is displaced in parallel, according to the second embodiment.

FIG. 13 is a plan view schematically showing, on the plane of rotation λ, the driven gear 20A displaced in parallel with respect to the drive gear 10. On the plane of rotation λ, R denotes a radius at the point of intersection E of the line segment $L_4$ passing through the origin O and the spiral curve S1 of the spiral tooth T1, and θ denotes an angle of the radius R at the origin O. In the first embodiment, the line segment obtained by projecting the tooth width center line $L_3$ of the driven gear 20 onto the plane of rotation λ, in the axial direction of the rotation axis $L_1$ overlaps with the line segment $L_4$. On the other hand, in the present embodiment, the line segment obtained by projecting the tooth width center line $L_3$ of the driven gear 20A onto the plane of rotation λ in the axial direction of the rotation axis $L_1$ is displaced in parallel from the line segment $L_4$ passing through the origin O. Here, Q denotes the amount of parallel displacement at this time. Ra denotes a radius at the point of intersection Ea of the projected line segment of the tooth width center line $L_3$ and the spiral curve S1 of the spiral tooth T1, and θa denotes an angle of the radius Ra at the origin O. Furthermore, γa denotes a tangent angle at point Ea, which is an angle between a tangent line TL of the spiral curve S1 at point Ea and an orthogonal line PL perpendicular to the radius Ra.

In order to use the spur gear having the tooth traces perpendicular to the tooth width center line $L_3$, the tangent line TL of the spiral tooth T1 needs to be perpendicular to the tooth width center line $L_3$. That is, an angle ε between the tangent line TL of the spiral tooth T1 at point Ea and the tooth width center line $L_3$ needs to be π/2 radians. In order to achieve the angle ε of π/2 radians, a value obtained by adding the tangent angle γa to an angle ω between the orthogonal line PL perpendicular to the radius Ra and the tooth width center line $L_3$ needs to be π/2 radians as follows.

$$\omega + \gamma a = \pi/2 \quad (21)$$

Since ω in Equation (21) can be rewritten as {π/2−(θa−θ)}, referring to the figure, the tangent angle γa and the angle (θa−θ) need to be equal in order to achieve the angle ε of π/2 radians, as follows.

$$\theta a - \theta = \gamma a \quad (22)$$

Since the tangent angle γa at point Ea is expressed by γa=a tan(a/Ra) using Equation (12), Equation (22) can be rewritten as follows.

$$\theta a - \theta = a \tan(a/Ra) \quad (23)$$

On the other hand, the parallel displacement amount Q is expressed as follows.

$$Q = Ra \times \sin(\theta a - \theta) \quad (24)$$

Therefore, according to Equations (23) and (24), a parallel displacement amount $Q_0$ that achieves application of the spur gear having the tooth traces perpendicular to the tooth width center line $L_3$ is expressed by the following equation.

$$Q_0 = Ra \times \sin\{a \tan(a/Ra)\} \quad (25)$$

According to the gear reduction mechanism 1A of the second embodiment, the spur gear is used as the driven gear 20A, and thus, this not only provides effects similar to those achieved in the first embodiment, but also reduces cost of accuracy measurement compared with the driven gear 20 of the helical gear, because there is no need to prepare a master gear with a special helix angle.

Example

An example in which the design parameters of the drive gear and the driven gear were specifically set according to the first embodiment will be described.

First, the module m was set to 0.65, which is a design parameter common to the drive gear 10 and the driven gear 20. Furthermore, the number of teeth of the drive gear 10 was 5, and the number of teeth Z of the driven gear 20 was 29. Thus, the reduction ratio (y/x) of the gear reduction mechanism 1 was 5/29. Furthermore, the spiral teeth of the drive gear 10 were formed on a surface parallel to the plane of rotation λ. That is, the angle φ between the plane of rotation λ and the conical surface σ was 0 degrees.

The constant a of the spiral curve was obtained by substituting the values of the number of teeth Z of the driven gear 20, the module m, the reduction ratio (y/x), and the angle φ, into Equation (7) (a=1.625). Furthermore, by substituting the values of the module m and the angle φ into Equation (4), the radial pitch Pt of the spiral curve was obtained (Pt=0.65×π). By substituting the values of the constant a and the pitch Pt into Equations (8) and (9), it was confirmed that n was an integer of 2 or more (n=5). Thereby, the constant a of the spiral curve was set to 1.625.

The maximum radius Rmax of the drive gear 10 was set to 33 mm, and the minimum radius Rmin of the drive gear 10 was set to 28 mm so that at least two spiral teeth of the drive gear 10 overlap in the radial direction.

The tangent angle γ of the spiral teeth of the drive gear 10 was calculated by substituting the known maximum radius Rmax or minimum radius Rmin into Equation (12), and a range from γmin (=2.819105) to γmax (=3.321476) was obtained. When a helical gear having a helix angle β is used as the driven gear 20 meshing with the drive gear 10, the helix angle β was set to γmax (=3.321476) because the helix angle β can be a value from γmin to γmax according to Equation (13).

The tooth width W of the driven gear 20 was set to 2 mm, and the crowning magnitude δ (=0.018 mm) was calculated by Equations (13) to (19), using the values of the tooth width W, the constant a, the maximum radius Rmax, and the minimum radius Rmin.

The contents of the invention have been described in detail above with reference to the preferred embodiments, but it is apparent that one skilled in the art can make various types of modifications based on the basic technical concept and teachings of the invention.

For example, although the spiral curves S1 to S5 defining the tooth traces of the spiral teeth T1 to T5 has a left-handed pattern having the radius gradually increasing counterclockwise from the origin O, the spiral curves S1 to S5 may have a right-handed pattern having the radius gradually increasing clockwise from the origin O. Furthermore, for the spiral curves S1 to S5, an involute spiral may be used instead of the Archimedean spiral. Furthermore, although the drive gear 10 having five spiral teeth T1 to T5 is described above as an example, the number of spiral teeth may be two or more.

The required amount of overlap in the circumferential direction between adjacent spiral teeth is set because at least two spiral teeth T1 to T5 of the drive gear 10 needs to overlap in any radial direction. This includes a case in which the spiral teeth T1 and T3 do not necessarily overlap in the circumferential direction. However, there is concern that, in FIG. 6, if the spiral tooth T3 meshing with the tooth t3 of the driven gear 20 ends, and the next spiral tooth T1 does not already mesh with the tooth t1, rotational motion of the drive gear 10 cannot be smoothly transmitted to the driven gear 20. Therefore, it is preferable that the spiral teeth T1 and T3 overlap in the circumferential direction. Therefore, the minimum radius Rmin may be set such that each spiral tooth overlaps two adjacent spiral teeth in the circumferential direction, when three or more spiral teeth are provided.

REFERENCE SYMBOL LIST

10 Drive gear
20 Driven gear
T1 to T5 Spiral teeth
S1 to S5 Spiral curves
$L_1$, $L_2$ Rotation axis
$L_3$ Tooth width center line
R Radius
Rmax Maximum radius
Rmin Minimum radius
σ Conical surface
λ Plane of rotation
θpt Circumferential Pitch
γ, γmax, γmin Tangent angle
δ Magnitude of crowning
β Helix angle
TL, $TL_1$ Tangent line
PL, $PL_1$ Orthogonal line
Q Parallel displacement amount

What is claimed is:

1. A driven gear driven in mesh with a drive gear comprising spiral teeth, each having a tooth trace of a spiral curve having a spiral center on a rotation axis and a constant radial pitch, when viewed in a direction of the rotation axis, the driven gear having a rotation axis that is noncoplanar with the rotation axis of the drive gear, wherein the driven gear is a helical gear having a helix angle β within a range specified by $$\gamma min \leq \beta \leq \gamma max$$

wherein γmin is an angle between a tangent line to the spiral curve of a spiral tooth at a maximum radius that is a radius at a point farthest from the rotation axis of the drive gear, and a line segment perpendicular to the maximum radius, and γmax is an angle between a tangent line to the spiral curve of a spiral tooth at a minimum radius that is a radius at a point closest to the rotation axis of the drive gear, and a line segment perpendicular to the minimum radius.

2. The driven gear according to claim 1, wherein each of the spiral teeth is formed along a curve obtained by projecting the spiral curve in the direction of the rotation axis onto a conical surface of a cone that has an axis coinciding with the rotation axis.

3. The driven according to claim 1, wherein two or more spiral teeth overlap in a radial direction at any angle around the rotation axis.

4. The driven according to claim 1, wherein
the spiral curves are arranged at even angular intervals around the rotation axis, and
each of the spiral teeth has the tooth trace of the corresponding spiral curve.

5. The driven gear according to claim 1, wherein the helix angle β is set to zero when an amount of parallel displacement from a point at which the helical gear and the drive gear are in mesh satisfies a predetermined condition.

6. The driven gear according to claim 1, wherein a crowning magnitude of the helical gear is set based on a contact state of a spiral tooth at the minimum radius and a tooth of the helical gear.

7. The driven gear according to claim 1, wherein the helical gear has a radius less than the maximum radius of the drive gear.

* * * * *